United States Patent
Shen et al.

(10) Patent No.: US 12,309,010 B2
(45) Date of Patent: May 20, 2025

(54) METHOD AND DEVICE FOR SCS CONFIGURATION BETWEEN CHANNEL

(71) Applicant: VIVO MOBILE COMMUNICATION CO., LTD., Guangdong (CN)

(72) Inventors: Xiaodong Shen, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 461 days.

(21) Appl. No.: 17/577,822

(22) Filed: Jan. 18, 2022

(65) Prior Publication Data
US 2022/0141070 A1    May 5, 2022

Related U.S. Application Data

(63) Continuation of application No. PCT/CN2020/102086, filed on Jul. 15, 2020.

(30) Foreign Application Priority Data

Jul. 19, 2019 (CN) .......................... 201910655971.2

(51) Int. Cl.
| | |
|---|---|
| *H04W 4/00* | (2018.01) |
| *H04L 27/26* | (2006.01) |
| *H04W 72/044* | (2023.01) |
| *H04W 72/23* | (2023.01) |
| *H04W 76/20* | (2018.01) |

(52) U.S. Cl.
CPC ..... *H04L 27/26025* (2021.01); *H04W 72/044* (2013.01); *H04W 72/23* (2023.01); *H04W 76/20* (2018.02)

(58) Field of Classification Search
CPC ... H04W 76/20; H04W 72/32; H04W 72/044; H04L 27/26025; H04L 5/0091
See application file for complete search history.

(56) References Cited

U.S. PATENT DOCUMENTS

| | | |
|---|---|---|
| 10,925,079 B2 | 2/2021 | Park et al. |
| 11,160,051 B2 | 10/2021 | Park et al. |
| 2017/0367046 A1 | 12/2017 | Papasakellariou |
| 2018/0049060 A1* | 2/2018 | Fujishiro ............... H04W 72/30 |
| 2019/0036665 A1 | 1/2019 | Park et al. |

(Continued)

FOREIGN PATENT DOCUMENTS

| | | |
|---|---|---|
| CN | 109565403 A | 4/2019 |
| CN | 109586883 A | 4/2019 |

(Continued)

OTHER PUBLICATIONS

Extended European Search Report on the European Patent Application No. 20843040.5 issued by the European Patent Office on Sep. 14, 2022.

(Continued)

*Primary Examiner* — Abdelnabi O Musa
(74) *Attorney, Agent, or Firm* — IP & T GROUP LLP

(57) ABSTRACT

A parameter processing method includes: transmitting configuration information to a terminal for indicating SCS configuration information of a channel on the same BWP, wherein different channels have different SCS configuration information or the same channel has different SCS configuration information in different cases.

18 Claims, 3 Drawing Sheets

(56) References Cited

U.S. PATENT DOCUMENTS

| | | | |
|---|---|---|---|
| 2019/0141734 A1 | 5/2019 | Lei et al. | |
| 2019/0215812 A1 | 7/2019 | Lyn | |
| 2019/0349180 A1* | 11/2019 | Lu | H04L 27/2607 |
| 2019/0394751 A1* | 12/2019 | Park | H04W 72/0453 |
| 2020/0028659 A1* | 1/2020 | Huang | H04L 5/0092 |
| 2020/0029307 A1 | 1/2020 | Takeda et al. | |
| 2020/0053724 A1* | 2/2020 | MolavianJazi | H04W 52/367 |
| 2020/0092073 A1* | 3/2020 | Papasakellariou | H04W 72/0446 |
| 2020/0221453 A1 | 7/2020 | Park | |
| 2020/0404690 A1* | 12/2020 | Lee | H04L 5/005 |
| 2021/0212103 A1* | 7/2021 | Lin | H04W 72/23 |
| 2021/0360591 A1* | 11/2021 | Ji | H04L 5/0053 |
| 2021/0360683 A1* | 11/2021 | Chen | H04W 72/0453 |
| 2022/0007208 A1* | 1/2022 | Zhou | H04L 5/0053 |

FOREIGN PATENT DOCUMENTS

| | | |
|---|---|---|
| CN | 109600794 A | 4/2019 |
| CN | 109891988 A | 6/2019 |
| CN | 110024323 A | 7/2019 |
| WO | 2018/056339 A1 | 3/2018 |
| WO | 2018/133754 A1 | 7/2018 |
| WO | 2018/227209 A1 | 12/2018 |

OTHER PUBLICATIONS

First Office Action for the Chinese Patent Application No. 201910655971.2 issued by the Chinese Patent Office on Sep. 22, 2022.

Second Office Action for the Chinese Patent Application No. 201910655971.2 issued by the Chinese Patent Office on Jun. 30, 2023.

Coexistence and channel access for NR unlicensed band operations, 3GPP TSG RAN WG1, Apr. 8-12, 2019, pp. 1-20, Meeting #96bis, Xi'an, China.

Ambiguity in starting instance of MAC timer for different SCS between UL and DL, 3GPP TSG-RAN WG2, Nov. 12-16, 2018, pp. 1-3, Meeting#104 Spokane, USA.

Draft CR on the limit of BDs/CCEs for CA, 3GPP TSG RAN WG1 Meeting #95. Nov. 12-16, 2018, R1-18xxxxx, Hwawei, HiSilicon, Spokane, USA.

Time-domain resource allocation for NR, 3GPP TSG RAN WG1 NR Ad-Hoc#2, Jun. 27-30, 2017, R1-1710165, Guangdong OPPO Mobile Telecom, Qingdao, P.R. China.

International Search Report and Written Opinion of Priority Application No. PCT/CN2020/102086 issued by the Chinese Patent Office on Oct. 9, 2020.

* cited by examiner

METHOD AND DEVICE FOR SCS CONFIGURATION BETWEEN CHANNEL

CROSS-REFERENCE TO RELATED APPLICATIONS

The present application is a Bypass Continuation application of PCT/CN2020/102086 filed on Jul. 15, 2020, which claims priority to Chinese Patent Application No. 201910655971.2 filed on Jul. 19, 2019, which are incorporated herein by reference in their entirety.

TECHNICAL FIELD

The present disclosure relates to the field of communications technology, and in particular, to a parameter method, a device, and a computer readable storage medium.

BACKGROUND

For high-frequency millimeter wave (>52.6 GHz) systems, due to the increase in frequency, the bandwidth of available frequencies increases. For example, approximately 7 GHz frequency is available in the 60 Hz frequency band. Therefore, in order to support a larger peak rate, a high frequency millimeter wave system usually needs to support a large bandwidth (for example, 2 GHz). At this time, compared to FR1 (<7 GHz) and FR2 (>7 GHz&<52.6 GHz), it is necessary to use a larger subcarrier space (SCS) (for example, 0.96 M, 1.92 M, 3.84 MHz) to reduce the size of fast Fourier transformation (FFT).

SUMMARY

Embodiments of the present disclosure provide a parameter processing method and a device.

According to a first aspect, embodiments of the present disclosure provide a parameter processing method. The parameter processing method is applied to a network side device and includes:

transmitting configuration information to a terminal, wherein the configuration information is used to indicate SCS configuration information of a channel on a same bandwidth part (BWP), and different channels have different SCS configuration information or a same channel has different SCS configuration information in different cases.

According to a second aspect, embodiments of the present disclosure provide a parameter processing method. The parameter processing method is applied to a terminal device and includes:

receiving configuration information transmitted by a network side device, wherein the configuration is used to indicate SCS configuration information of a channel on a same BWP, and different channels have different SCS configuration information or a same channel has different SCS configuration information in different cases; and determining SCS of a target channel according to the configuration information.

According to a third aspect, embodiments of the present disclosure further provide a network side device, including:

a first transmitting module, configured to transmit configuration information to a terminal, wherein the configuration information is used to indicate SCS configuration information of a channel on the same BWP, and different channels have different SCS configuration information or the same channel has different SCS configuration information in different cases.

According to a fourth aspect, embodiments of the present disclosure further provide a terminal device, including:

a first receiving module, configured to receive configuration information transmitted by a network side device, wherein the configuration information is used to indicate SCS configuration information of a channel on the same BWP, and different channels have different SCS configuration information or the same channel has different SCS configuration information in different cases; and a first determining module, configured to determine SCS of a target channel according to the configuration information.

According to a fifth aspect, embodiments of the present disclosure further provide a network side device, including: a memory, a processor, and a computer program stored in the memory and executable on the processor, wherein when the computer program is executed by the processor, the steps of the parameter processing method according to the first aspect are implemented.

According to a sixth aspect, embodiments of the present disclosure further provide a terminal device, including: a memory, a processor, and a computer program stored in the memory and executable on the processor, wherein when the computer program is executed by the processor, the steps of the parameter processing method according to the second aspect are implemented.

According to a seventh aspect, embodiments of the present disclosure further provide a non-transitory computer readable storage medium, wherein the non-transitory computer readable storage medium stores a computer program; and when the computer program is executed by a processor, the steps of the above parameter processing method are implemented.

BRIEF DESCRIPTION OF THE DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

There is already a method for configuring SCS between physical downlink control channel (PDCCH) and physical downlink shared channel (PDSCH) on the same bandwidth part (BWP), and PDSCH/physical uplink shared channel (PUSCH) and PDSCH/PUSCH. However, the configuration mode in related art limits the coverage range of the channel.

Figure 1:
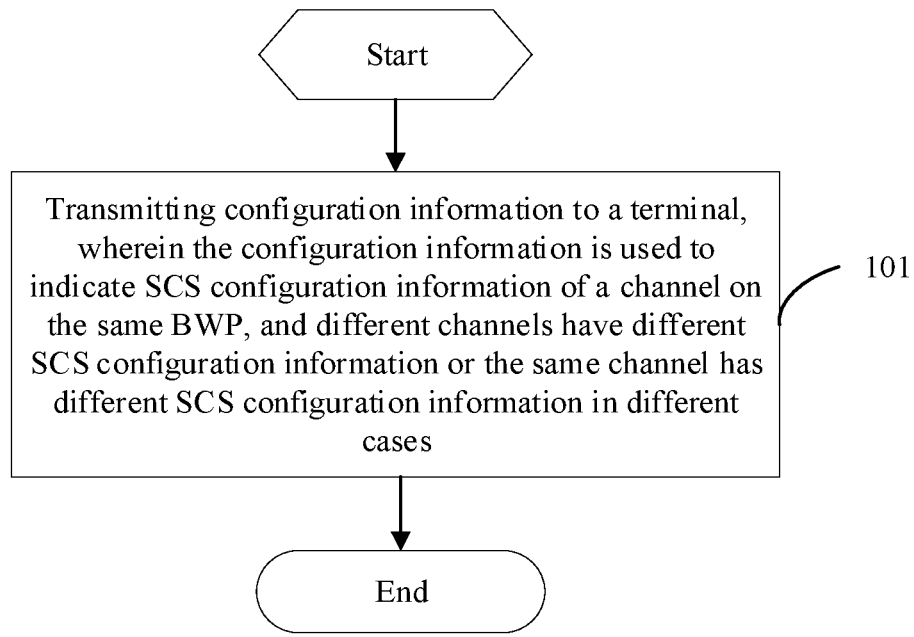
FIG. 1 is a first flowchart of a parameter processing method according to an embodiment of the present disclosure.

Referring to FIG. 1, FIG. 1 is a flowchart of a parameter processing method according to an embodiment of the present invention. The parameter processing method is applied to a network side device, as shown in FIG. 1, and includes the following steps:

step 101: transmitting configuration information to a terminal, wherein the configuration information is used to indicate SCS configuration information of a channel on the same BWP, and different channels have different SCS configuration information or the same channel has different SCS configuration information in different cases.

In the embodiment of the present disclosure, different channels have different SCS configuration information or the same channel has different SCS configuration information in different cases, including at least one of the following.

The first case: a physical downlink control channel (PDCCH) and a physical downlink shared channel (PDSCH) have different SCS configuration information.

In this case, the configuration information is transmitted to the terminal through system information or radio resource control (RRC) signaling.

For example, SCS configuration information of the PDCCH and the PDSCH may be configured respectively through the system information or RRC signaling.

The second case: the PDCCH and the PDCCH have different SCS configuration information.

In this case, the configuration information may be transmitted through at least one of the following ways:

(1) transmitting at least two pieces of SCS configuration information to the terminal through the system information or RRC signaling.

In this case, at least one selection rule may also be transmitted to the terminal through the system information or the RRC signaling. The selection rule is used to determine SCS of a target PDCCH according to the at least two pieces of SCS configuration information. The selection rule may also be predefined in a protocol. The selection rule includes at least one of the following:

A: determining SCS configuration information of the target PDCCH according to the type of the search space of the target PDCCH;

the type of the search space may include: common search space (CSS) types 0, 1, 1A, 2, 3, and a user specific search space (USS). For example, it may be configured: broadcast or multicast CSS uses a smaller SCS, and unicast USS uses a larger SCS.

B: determining the SCS configuration information of the target PDCCH according to the downlink control information (DCI) format monitored on the search space of the target PDCCH, wherein the target PDCCH refers to any PDCCH.

For example, it may be configured: one SCS is used when the DCI format is fall back DCI, and other SCSs are used when the DCI formats are non-fall back DCIs.

C: determining the SCS configuration information of the target PDCCH according to the aggregation level (AL) monitored in the search space of the target PDCCH.

For example, it may be configured to use low SCS when the transmitted minimum AL is greater than a certain value (for example, 4), and use high SCS in other cases.

(2) Configuring the SCS configuration information for each search space of each PDCCH, where the SCS configuration information between at least two search spaces is different.

For example, SCS configuration information may be configured separately for each search space of the PDCCH.

The third case: a first channel and a second channel have different SCS configuration information, wherein the first channel and the second channel are selected from a PDSCH and a physical uplink shared channel (PUSCH).

That is, in this case, it may be configured: PDSCH and PUSCH, PDSCH and PDSCH, and PUSCH and PUSCH have different SCS configuration information.

In this way, the configuration information may be transmitted to the terminal through at least one of the following ways:

(1) configuring the SCS configuration information of the PDCCH for scheduling the first channel as the SCS configuration information of the first channel, and configuring the SCS configuration information of the PDCCH for scheduling the second channel as the SCS configuration information of the second channel.

That is, the respective search space of the first channel or the second channel is used to determine the used SCS configuration information.

(2) Transmitting at least two pieces of SCS configuration information to the terminal through the system information or RRC signaling.

In this case, at least one selection rule may also be transmitted to the terminal through the system information or the RRC signaling, wherein the selection rule is used to determine the SCS of the first channel and the SCS of the second channel according to the at least two pieces of SCS configuration information, and the selection rule may also be predefined in a protocol.

The selection rule includes at least one of the following:

A1: determining the SCS of the first channel by using the type of the search space of the PDCCH for scheduling the first channel, and determining the SCS of the second channel by using the type of the search space of the PDCCH for scheduling the second channel.

For example, a PDSCH or PUSCH scheduled by a broadcast or multicast search space (CSS) uses a smaller SCS, and a PDSCH or PUSCH scheduled by a unicast search space (USS) uses a larger SCS.

B1: determining the SCS of the first channel by using the DCI format monitored on the search space of the PDCCH for scheduling the first channel, and determining the SCS of the second channel by using the DCI format monitored on the search space of the PDCCH for scheduling the second channel.

For example, it may be configured: a certain SCS is used when the DCI format is a fall back DCI, and another SCS is used when the DCI format is a non-fall back DCI.

C1: determining the SCS of the first channel by using the radio network temporary identifier (RNTI) type monitored on the search space of the PDCCH for scheduling the first channel, and determining the SCS of the second channel by using the RNTI type monitored on the search space of the PDCCH for scheduling the second channel.

For example, cell RNTI (C-RNTI), semi persistent cell RNTI (SP-C-RNTI) and configured scheduling RNTI (CS-RNTI) use larger SCS; and system information RNTI (SI-RNTI), paging RNTI (P-RNTI), random access RNTI (RA-RNTI) and other scheduled data use smaller SCS.

D1: determining the SCS of the first channel through a parameter of the first channel configured by a higher layer, and determining the SCS of the second channel through a parameter of the second channel configured by a higher layer.

For example, using the PDCCH as an example, the PDSCH configures the smallest KO value in the resource allocation list. If the value is greater than a certain threshold, the PDSCH uses the SCS configuration information transmitted by RRC or DCI; otherwise, the SCS configuration information confirmed by the PDCCH is used. For another example, a modulation mid coding scheme (MCS) table transmitted by the PDSCH, a smaller SCS is used in a case that it is configured to use a 64 quadrature amplitude modulation (QAM) table, and a larger SCS is used in a case that it is configured to use a 256 QAM table.

(3) indicating the SCS configuration information of the first channel and the SCS configuration information of the second channel through the DCI.

In this case, it may be indicated in at least one of the following ways:

A2: determining the SCS configuration information of the first channel and the SCS configuration information of the second channel according to the size of the DCI frequency domain allocation resource.

For example, when the allocated frequency domain resource is less than a certain value, smaller SCS configuration information is used; otherwise, larger SCS configuration information is used.

B2: in the first time period after the DCI, using the SCS configuration information transmitted through RRC signaling or the SCS configuration information of the PDCCH for scheduling the first channel as the SCS configuration information of the first channel, and using the SCS configuration information transmitted through the RRC signaling or the SCS configuration information of the PDCCH for scheduling the second channel as the SCS configuration information of the second channel; and at other times, using the SCS configuration information indicated by the DCI as the SCS configuration information of the first channel or the SCS configuration information of the second channel.

A time duration of the first time period may be implicitly determined according to UE capabilities or explicitly configured through RRC or a medium access control (MAC) control element (CE).

C2: indicating the SCS configuration information of the first channel and the SCS configuration information of the second channel through a specified domain of the DCI.

The fourth case: channels transmitted on at least two different time domain resources have different SCS configuration information.

In this case, the configuration information may be transmitted to the terminal through at least one of the following ways:

A3: indicating that at least two different time domain resources have different SCS configuration information through RRC signaling.

For example, RRC signaling may be used to explicitly configure that different slots use different SCS configuration information.

B3: configuring at least two pieces of SCS configuration information, a corresponding relationship between the SCS configuration information and the characteristics of the time domain resources through the RRC signaling.

That is, in this way, RRC configures a plurality of SCS configuration information, and implicitly determines the SCS configuration information through the slot characteristic.

For example, a certain SCS is used for a slot that includes the transmission of the PDCCH search space, and another SCS is used for the slot that does not include the transmission of the PDCCH search space.

In the embodiments of the present disclosure, the channels on the same BWP have different SCS configuration information, so that different channels have different SCS configuration information or the same channel has different SCS configuration information in different cases. Therefore, the solution of the embodiments of the present disclosure can enlarge the coverage range of the channel.

In the embodiment of the present disclosure, in order for the terminal device to accurately determine the SCS of the channel, the reference SCS may also be transmitted to the terminal, wherein the reference SCS is any constant, and the constant includes the SCS of any channel on the BWP. That is, in a case that different SCS configuration information is adopted in different channels of the same BWP or in different cases of the same channel, reference SCS of a time-frequency domain configuration parameter (such as time domain resource allocation (TDRA) and frequency domain resource allocation (FDRA)) may also be determined. For example, the SCS of a channel may be explicitly configured by RRC or implicitly specified as the reference SCS (such as PDCCH).

In addition, on the basis of the foregoing embodiment, in order to ensure reliable signal transmission, the SCS configuration information of the reference signal in the BWP is also transmitted to the terminal.

Optionally, in a case of channel transmission at the same time when the reference signal is transmitted, determining the SCS configuration information of the reference signal is the SCS configuration information of the channel; and in a case of no channel transmission at the same time when the reference signal is transmitted, the SCS configuration information of the reference signal is configured through any one or more of the following ways: system information, RRC signaling, MAC CE and DCI.

That is, the SCS of the reference signal in a BWP uses the SCS of its transmission channel at the same time by default. In a case that there is no other channel for simultaneous transmission, the system information or the SCS transmitted by the RRC/MAC CE is used, or the SCS indicated by the DCI may be used for the triggered aperiodic reference signal.

It should be noted that for the different processing methods in each of the above transmission methods, the system supports multiple modes for transformation, and the modes used by the user may be configured through master information block (MIB) or system information block (SIB) or RRC. For example, for the third mode, different SCS configurations of PDSCH/PUSCH may be instructed to adopt respective search space configurations, implicit rules transmitted by RRC, or DCI configuration.

Figure 2:
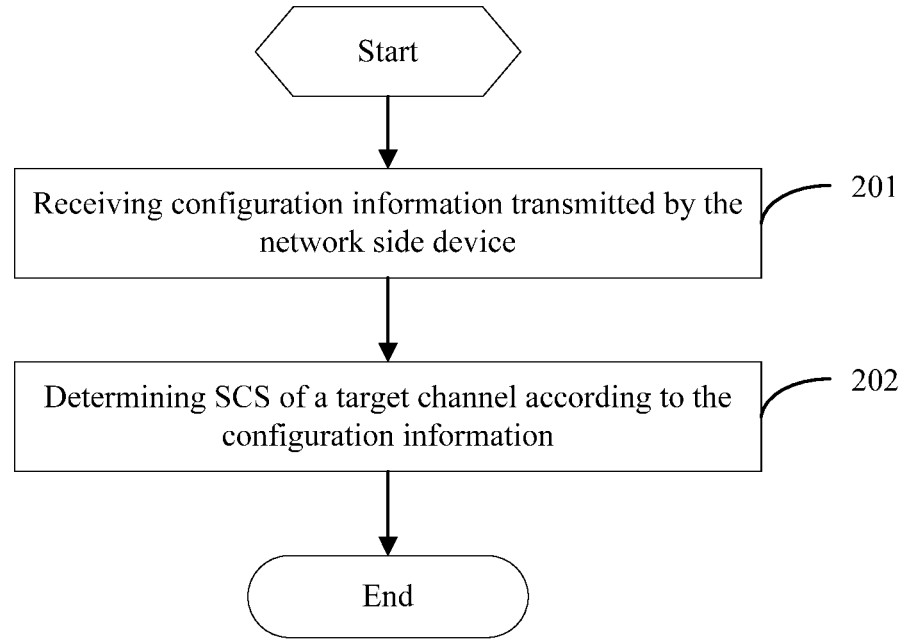
FIG. 2 is a second flowchart of a parameter processing method according to an embodiment of the present disclosure.

Referring to FIG. 2, FIG. 2 is a flowchart of a parameter processing method according to an embodiment of the present disclosure. The parameter processing method is applied to a terminal device. As shown in FIG. 2, the method includes the following steps.

Step 201: receiving configuration information transmitted by a network side device, wherein the configuration information is used to indicate the SCS configuration information of the channel on the same BWP. Different channels have different SCS configuration information or the same channel has different SCS configuration information in different cases.

Step 202: determining the SCS of the target channel according to the configuration information.

In the embodiment of the present disclosure, there may be different ways of determining the SCS of the target channel according to different contents included in the configuration information. The target channel may be any one or more of PDCCH, PUSCH, PUCCH, and PDSCH.

Different channels have different SCS configuration information or the same channel has different SCS configuration information in different cases, which may include different cases.

In the first case, PDCCH and PDSCH have different SCS configuration information.

In this case, the terminal device obtains the SCS configuration information of the PDCCH transmitted by the network side device through system information or RRC signaling, and obtains the SCS configuration information of the PDSCH transmitted by the network side device through system information or RRC signaling.

In the second case, the PDCCH and the PDCCH have different SCS configuration information.

(1) In this case, the terminal device may obtain at least two pieces of SCS configuration information transmitted by the network side device through system information or RRC signaling. After that, the SCS of the target PDCCH is determined according to the at least two pieces of SCS configuration information and at least one selection rule. The selection rule is configured by the network side device or agreed in advance.

Optionally, the SCS of the target PDCCH may be determined in at least one of the following ways:

determining the SCS of the target PDCCH according to the type of the target PDCCH search space; determining the SCS of the target PDCCH according to the DCI format monitored by the target PDCCH search space; or determining the SCS of the target PDCCH according to the AL monitored in the target PDCCH search space.

(2) In this case, the terminal device may determine the SCS of the target PDCCH according to the SCS configuration information in the search space of the target PDCCH.

In the third case, the first channel and the second channel have different SCS configuration information. The first channel and the second channel are selected from: PDSCH and PUSCH.

The terminal device may determine the SCS of the target channel in at least one of the following ways:

(1) The terminal device determines the SCS of the first channel according to the SCS configuration information of the PDCCH for scheduling the first channel, and determines the SCS of the second channel according to the SCS configuration information of the PDCCH for scheduling the second channel.

(2) The terminal device receives the DCI indication of the network side device, and determines the SCS of the first channel and the SCS of the second channel according to the DCI indication.

Optionally, the terminal may determine the SCS of the first channel and the SCS of the second channel in any of the following ways according to different indication forms of the DCI.

A4: determining the SCS of the first channel and the SCS of the second channel according to the size of the DCI frequency domain allocation resource.

B4: in a first time period after the DCI is obtained, determining the SCS of the first channel by using the SCS configuration information transmitted by the network side device through the RRC signaling or the SCS configuration information of the PDCCH for scheduling the first channel, and determining the SCS of the second channel by using the SCS configuration information transmitted by the network side device through the RRC signaling or the SCS configuration information of the PDCCH for scheduling the second channel; and at other times, determining the SCS configuration information indicated by the DCI as the SCS of the first channel or the SCS of the second channel.

C4: determining the SCS of the first channel and the SCS of the second channel according to information indicated by a specified domain of the DCI.

(3) The terminal device obtains at least two pieces of SCS configuration information transmitted by the network side device through system information or RRC signaling. Afterwards, the SCS of the first channel and the SCS of the second channel are determined according to the at least two pieces of SCS configuration information and at least one selection rule, wherein the selection rule is configured by the network side device or agreed in advance.

Optionally, the terminal device may determine the SCS of the first channel and the SCS of the second channel in at least one of the following ways:

A5: determining the SCS of the first channel by using the type of the search space of the PDCCH for scheduling the first channel, and determining the SCS of the second channel by using the type of the search space of the PDCCH for scheduling the second channel.

B5: determining the SCS of the first channel by using the DCI format monitored on the search space of the PDCCH for scheduling the first channel, and determining the SCS of the second channel by using the DCI format monitored on the search space of the PDCCH for scheduling the second channel.

C5: determining the SCS of the first channel by using a radio network temporary identifier (RNTI) type monitored on the search space of the PDCCH for scheduling the first channel, and determining the SCS of the second channel by using an RNTI type monitored on the search space of the PDCCH for scheduling the second channel.

D5: determining the SCS of the first channel through a parameter of the first channel configured by a higher layer, and determining the SCS of the second channel through a parameter of the second channel configured by a higher layer.

In the fourth case, the terminal device determines a target time domain resource used for transmitting the target channel. After that, the SCS of the target channel is determined according to the target time domain resource and the SCS configuration information of different time domain resources transmitted by the network side device; or the SCS of the target channel is determined according to the characteristics of the target time domain resource, the at least two pieces of SCS configuration information transmitted by the network side device, and the corresponding relationship between the SCS configuration information and the time domain resource characteristic.

In the embodiment of the present disclosure, the above-mentioned parameter processing method may be applied to terminal devices, such as a mobile phone, a tablet personal computer, a laptop computer, a personal digital assistant (PDA), a mobile Internet device (MID) or a wearable device, etc.

In the embodiments of the present disclosure, the channels on the same BWP have different SCS configuration information, so that different channels have different SCS configuration information or the same channel has different SCS configuration information in different cases. Therefore, the solution of the embodiments of the present disclosure can enlarge the coverage range of the channel.

On the basis of the foregoing embodiment, in order to ensure reliable signal transmission, the method may further include: determining the SCS of the reference signal in the BWP. Optionally, in a case of channel transmission at the same time when the reference signal is transmitted, the SCS of to the reference signal is determined according to the SCS configuration information of the channel; and in a case of no channel transmission at the same time when the reference signal is transmitted, the SCS of the reference signal is determined according to the SCS configuration information of the reference signal transmitted by the network side device through any one or more of the following ways: system information, RRC signaling, MAC CE and DCI.

In addition, in order to accurately determine the SCS of the target channel, in the embodiment of the present disclosure, the terminal device may also receive a reference SCS transmitted by the network side device, wherein the reference SCS is any constant, and the constant includes the SCS of any channel on the BWP.

In one embodiment of the present disclosure, a synchronization signal and PBCH block (SSB) uses a SCS1 bound to a frequency band, and an initially accessed user uses the SCS1 to search for a primary synchronization signal (PSS)/secondary synchronization signal (SSS), so as to obtain a physical broadcast channel (PBCH). PBCH indicates a PDCCH of SCS2 and a PDSCH/PUSCH scheduled by the SCS2 for a subsequent broadcast or multicast search space.

After the connection is established, the RRC indicates SCS3 used by the PDCCH of the unicast search space in the PDCCH configuration in the BWP, and SCS4 used by the PDSCH scheduled by the unicast search space in the PDSCH configuration in the BWP.

In this embodiment, a combination of the above solutions is adopted. PDCCH and PDCCH may have different SCS configuration information, PDSCH and PDSCH may have different SCS configuration information, and PDCCH and PDSCH may adopt different SCS configuration information.

In one embodiment of the present disclosure, the SSB uses the SCS1 bound to the frequency band, and the initially accessed user uses the SCS1 to search for PSS/SSS so as to obtain the PBCH. PBCH indicates a PDCCH of SCS2 and a PDSCH/PUSCH scheduled by the SCS2 for a subsequent broadcast or multicast search space.

Figure 3:
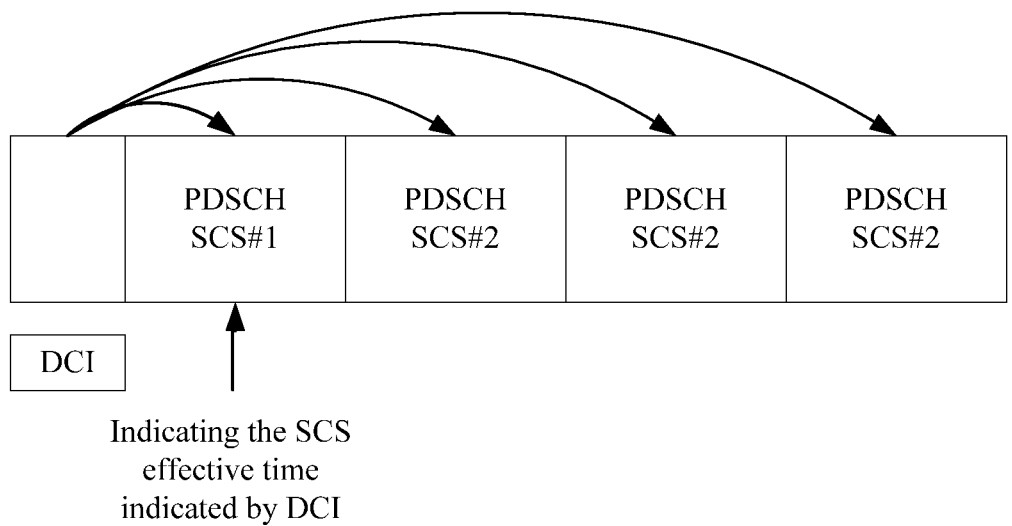
FIG. 3 is a schematic diagram of parameter processing provided according to an embodiment of the present disclosure.

After the connection is established, the RRC indicates the SCS3 used by the PDCCH of the unicast search space in the PDCCH configuration in the BWP. The PDSCH scheduled by the unicast search space is indicated by the DCI, and the RRC configures in advance the minimum effective time of the SCS indicated by the DCI to be 10 symbols after the last symbol of the DCI, and the SCS is changed at the granularity of the transmission block. As shown in FIG. 3, the effective time of the SCS configuration information is indicated by DCI.

It can be seen from the above embodiments that the solution of the embodiment of the present disclosure can enlarge the coverage range of a specific channel (for example, PDCCH) through a low SCS configuration, and save the overhead of beam scanning.

Figure 4:
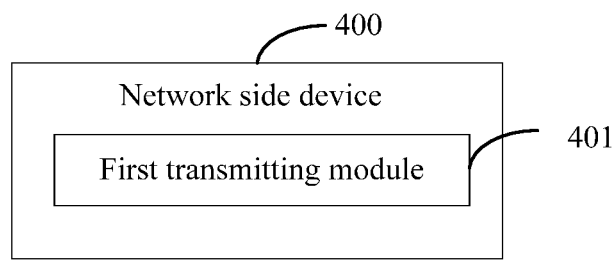
FIG. 4 is a first structural diagram of a network side device according to an embodiment of the present disclosure.

Referring to FIG. 4, FIG. 4 is a schematic structural diagram of a network side device according to an embodiment of the present disclosure. As shown in FIG. 4, a network side device 400 includes:

a first transmitting module 401, configured to transmit configuration information to a terminal, wherein the configuration information is used to indicate SCS configuration information of a channel on the same BWP, and different channels have different SCS configuration information or the same channel has different SCS configuration information in different cases.

Optionally, the different channels have different SCS configuration information or the same channel has different SCS configuration information in different cases, including at least one of the following.

PDCCH and PDSCH have different SCS configuration information; PDCCH and PDCCH have different SCS configuration information; a first channel and a second channel have different SCS configuration information, wherein the first channel and the second channel are selected from: PDSCH and PUSCH; or channels transmitted on at least two different time domain resources have different SCS configuration information.

Optionally, in the case that the PDCCH and the PDCCH have different SCS configuration information, the first transmitting module 401 may be configured to transmit the configuration information to the terminal through system information or radio resource control (RRC) signaling.

Optionally, in the case that the PDCCH and the PDCCH have different SCS configuration information, the first transmitting module may be configured to perform at least one of the following: transmitting at least two pieces of SCS configuration information to the terminal through system information or RRC signaling; or configuring SCS configuration information for each search space of each PDCCH, wherein the SCS configuration information between at least two search spaces is different.

Optionally, the first transmitting module 401 is further configured to transmit at least one selection rule to the terminal through the system information or the RRC signaling, wherein the selection rule is used to determine SCS of a target PDCCH according to the at least two pieces of SCS configuration information. The selection rule includes at least one of the following:

determining the SCS configuration information of the target PDCCH according to the type of the target PDCCH search space; determining the SCS configuration information of the target PDCCH according to the downlink control information (DCI) format monitored by the target PDCCH search space; or determining the SCS configuration information of the target PDCCH according to the aggregation level (AL) monitored in the target PDCCH search space.

Optionally, in a case that the first channel and the second channel have different SCS configuration information, the first transmitting module 401 may be configured to perform at least one of the following:

configuring the SCS configuration information of PDCCH for scheduling the first channel as SCS configuration information of the first channel, and configuring SCS configuration information of the PDCCH for scheduling the second channel as SCS configuration information of the second channel; transmitting at least two pieces of SCS configuration information to the terminal through system information or RRC signaling; or indicating the SCS configuration information of the first channel and the SCS configuration information of the second channel through DCI.

Optionally, the first transmitting module 401 is further configured to transmit at least one selection rule to the terminal through the system information or the RRC signaling, wherein the selection rule is used to determine the SCS of the first channel and the SCS of the second channel according to the at least two pieces of SCS configuration information. The selection rule includes at least one of the following:

determining the SCS of the first channel by using the type of the search space of the PDCCH for scheduling the first channel, and determining the SCS of the second channel by using the type of the search space of the PDCCH for scheduling the second channel;

determining the SCS of the first channel by using the DCI format monitored on the search space of the PDCCH for scheduling the first channel, and determining the SCS of the second channel by using the DCI format monitored on the search space of the PDCCH for scheduling the second channel;

determining the SCS of the first channel by using a radio network temporary identifier (RNTI) type monitored on the search space of the PDCCH for scheduling the first channel, and determining the SCS of the second channel by using an RNTI type monitored on the search space of the PDCCH for scheduling the second channel; or determining the SCS of the first channel through a parameter of the first channel configured by a higher layer, and determining the SCS of the second channel through a parameter of the second channel configured by a higher layer.

Optionally, the first transmitting module 401 may be configured to perform at least one of the following:

determining the SCS configuration information of the first channel and the SCS configuration information of the second channel according to the size of the DCI frequency domain allocation resource; in the first time period after the DCI, using the SCS configuration information transmitted through the RRC signaling or the SCS configuration information of the PDCCH for scheduling the first channel as the SCS configuration information of the first channel, and using the SCS configuration information transmitted through RRC signaling or the SCS configuration information of the PDCCH for scheduling the second channel as the SCS configuration information of the second channel; at other times, using the SCS configuration information indicated by the DCI as the SCS configuration information of the first channel or the SCS configuration information of the second channel; or indicating the SCS configuration information of the first channel and the SCS configuration information of the second channel through a specified domain of the DCI.

Optionally, in a case that channels transmitted on at least two different time domain resources have different SCS configuration information, the transmitting module 401 may be configured to perform at least one of the following:

indicating through the RRC signaling that at least two different time domain resources have different SCS configuration information; or configuring at least two pieces of SCS configuration information, a corresponding relationship between the SCS configuration information and the characteristics of the time domain resources through the RRC signaling.

Optionally, the network side device may further include: a second transmitting module, configured to transmit SCS configuration information of a reference signal in the BWP to the terminal.

Optionally, in a case of channel transmission at the same time when the reference signal is transmitted, determining the SCS configuration information of the reference signal is the SCS configuration information of the channel; and in a case of no channel transmission at the same time when the reference signal is transmitted, the SCS configuration information of the reference signal is configured through any one or more of the following ways: system information, RRC signaling, MAC CE and DCI.

Optionally, the network side device may further include: a third transmitting module, configured to transmit a reference SCS to the terminal, wherein the reference SCS is any constant, and the constant includes SCS of any channel on the BWP.

For the working principle of the network side device, refer to the description of the foregoing method embodiments.

In the embodiments of the present disclosure, the channels on the same BWP have different SCS configuration information, so that different channels have different SCS configuration information or the same channel has different SCS configuration information in different cases. Therefore, the solution of the embodiments of the present disclosure can enlarge the coverage range of the channel.

Figure 5:
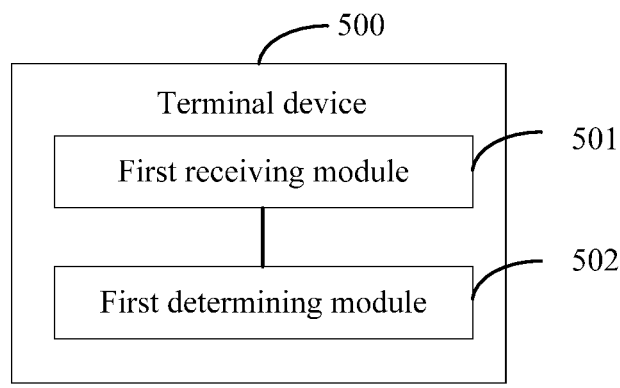
FIG. 5 is a first structural diagram of a terminal device according to an embodiment of the present disclosure.

Referring to FIG. 5, FIG. 5 is a structural diagram of a terminal device according to an embodiment of this disclosure. As shown in FIG. 5, the terminal device 500 includes:

a first receiving module 501, configured to receive configuration information transmitted by a network side device, wherein the configuration information is used to indicate SCS configuration information of a channel on the same BWP, and different channels have different SCS configuration information or the same channel has different SCS configuration information in different cases; and a first determining module 502, configured to determine the SCS of the target channel according to the configuration information.

Optionally, the PDCCH and the PDSCH have different SCS configuration information. The first determining module 502 may be configured to obtain SCS configuration information of the PDCCH transmitted by the network side device through system information or RRC signaling, and obtain SCS configuration information of the PDSCH transmitted by the network side device through the system information or the RRC signaling.

Optionally, the PDCCH and the PDCCH have different SCS configuration information. The first determining module 502 may be configured to obtain at least two pieces of SCS configuration information transmitted by the network side device through system information or RRC signaling; and determine the SCS of the target PDCCH according to the at least two pieces of SCS configuration information and at least one selection rule, wherein the selection rule is configured by the network side device or agreed in advance.

Optionally, when determining the SCS of the target PDCCH according to the at least two pieces of SCS configuration information and at least one selection rule, the first determining module 502 may be configured to perform at least one of the following:

determining the SCS of the target PDCCH according to the type of the target PDCCH search space; determining the SCS of the target PDCCH according to the DCI format monitored by the target PDCCH search space; or determining the SCS of the target PDCCH according to the AL monitored in the target PDCCH search space.

Optionally, the PDCCH and the PDCCH have different SCS configuration information. The first determining module 502 may be configured to determine SCS of the target PDCCH according to the SCS configuration information of the search space of the target PDCCH.

Optionally, the configuration information includes: a first channel and a second channel have different SCS configuration information, wherein the first channel and the second channel are selected from: PDSCH and PUSCH. The first determining module 502 may be configured to perform at least one of the following:

determining the SCS of the first channel according to the SCS configuration information of the PDCCH for scheduling the first channel, and determine the SCS of the second channel according to the SCS configuration information of the PDCCH for scheduling the second channel; or receiving the DCI indication of the network side device, and determining the SCS of the first channel and the SCS of the second channel according to the DCI indication.

Optionally, the first determining module 502 may be configured to perform at least one of the following:

determining the SCS of the first channel and the SCS of the second channel through the size of the DCI frequency domain allocation resource;

in a first time period after the DCI is obtained, determining the SCS of the first channel by using the SCS configuration information transmitted by the network side device through the RRC signaling or the SCS configuration information of the PDCCH for scheduling the first channel, and determining the SCS of the second channel by using the SCS configuration information transmitted by the network side device through the RRC signaling or the SCS configuration information of the PDCCH for scheduling the second channel; at other times, determining the SCS configuration information indicated by the DCI as the SCS of the first channel or the SCS of the second channel; or determining the SCS of the first channel and the SCS of the second channel according to information indicated by a specified domain of the DCI.

Optionally, a first channel and a second channel have different SCS configuration information, wherein the first channel and the second channel are selected from: PDSCH and PUSCH. The first determining module 502 may be configured to perform at least one of the following: obtaining at least two pieces of SCS configuration information transmitted by the network side device through system information or RRC signaling; or determining the SCS of the first channel and the SCS of the second channel according to the at least two pieces of SCS configuration information and at least one selection rule, wherein the selection rule is configured by the network side device or agreed in advance.

Optionally, when determining the SCS of the first channel and the SCS of the second channel according to the at least two pieces of SCS configuration information and at least one selection rule, the first determining module 502 may be configured to perform at least one of the following:

determining the SCS of the first channel by using the type of the search space of the PDCCH for scheduling the first channel, and determining the SCS of the second channel by using the type of the search space of the PDCCH for scheduling the second channel;

determining the SCS of the first channel by using the DCI format monitored on the search space of the PDCCH for scheduling the first channel, and determining the SCS of the second channel by using the DCI format monitored on the search space of the PDCCH for scheduling the second channel;

determining the SCS of the first channel by using a radio network temporary identifier (RNTI) type monitored on the search space of the PDCCH for scheduling the first channel, and determining the SCS of the second channel by using an RNTI type monitored on the search space of the PDCCH for scheduling the second channel; or determining the SCS of the first channel through a parameter of the first channel configured by a higher layer, and determining the SCS of the second channel through a parameter of the second channel transmitted by a higher layer.

Optionally, the first determining module 502 may include: a first determining submodule, configured to determine a target time domain resource used for transmitting the target channel; and a second determining submodule, configured to determine SCS of the target channel according to the target time domain resource and the SCS configuration information of different time domain resources transmitted by the network side device.

Optionally, the first determining module 502 may include: a third determining submodule, configured to determine a target time domain resource used for transmitting the target channel; a fourth determining submodule, configured to determine SCS of the target channel according to the characteristic of the target time domain resource, at least two pieces of SCS configuration information transmitted by the network side device, and a corresponding relationship between the SCS configuration information and the time domain resource characteristic.

Optionally, the device may further include: a second determining module, configured to determine SCS of a reference signal in the BWP.

Optionally, the second determining module may be configured to: in a case of channel transmission at the same time when the reference signal is transmitted, determine the SCS of the reference signal according to the SCS configuration information of the channel; and in a case of no channel transmission at the same time of the reference signal, determine the SCS of the reference signal according to the SCS configuration information of the reference signal transmitted by the network side device through any one or more of the following ways: system information, RRC signaling, MAC CE and DCI.

Optionally, the device may further include: a second receiving module, configured to receive a reference SCS transmitted by the network side device, wherein the reference SCS is any constant, and the constant includes SCS of any channel on the BWP.

The terminal device 500 can implement each process implemented by the terminal device in the foregoing method embodiment. To avoid repetition, details are not described herein again.

In the embodiment of the present disclosure, different SCS information is configured for the channels on the same BWP, so that different channels have different SCS configuration information or the same channel has different SCS configuration information in different cases. Therefore, the solution of the embodiments of the present disclosure can enlarge the coverage range of the channel.

Figure 6:
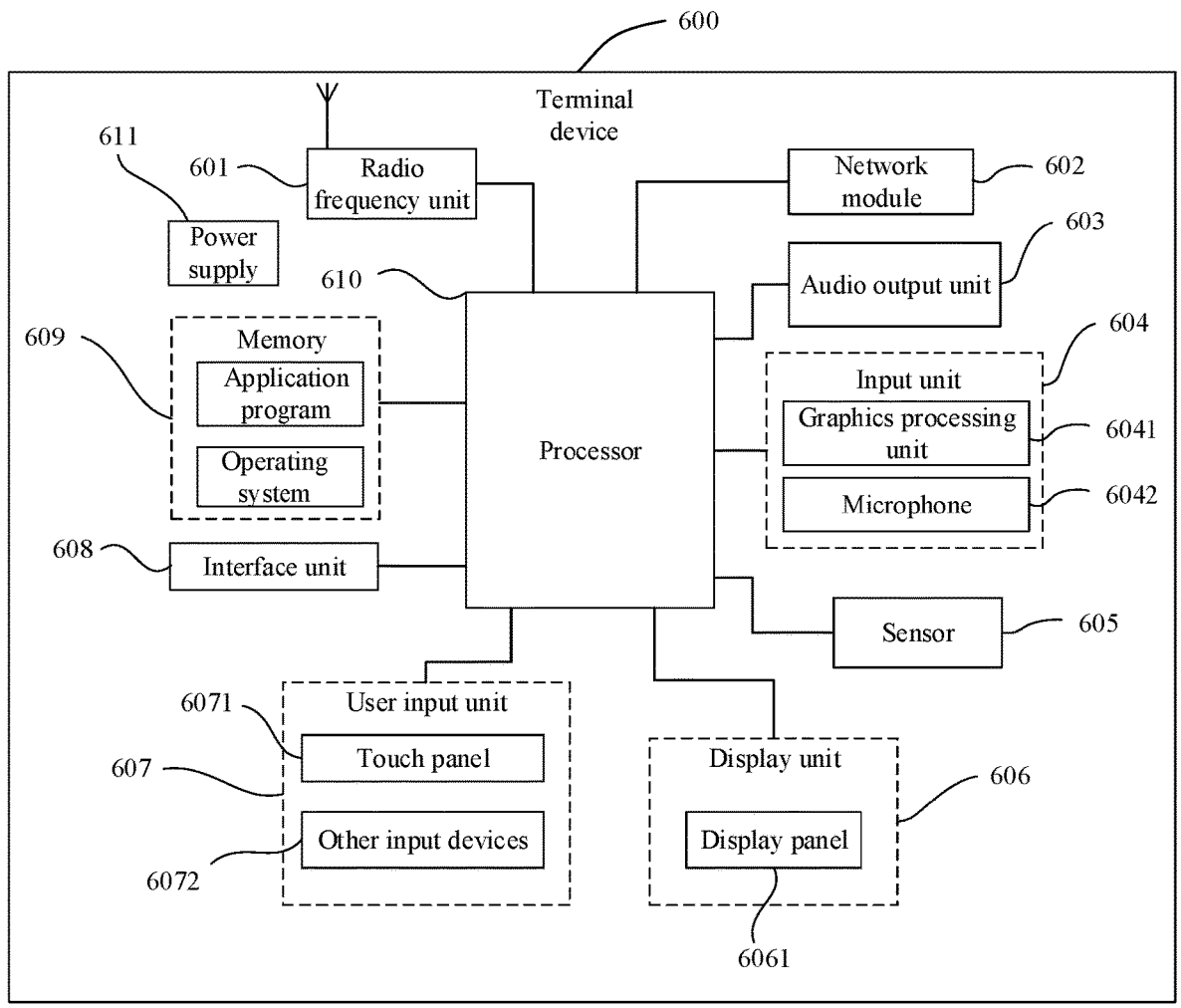
FIG. 6 is a second structural diagram of a terminal device according to an embodiment of the present disclosure.

FIG. 6 is a schematic diagram of a hardware structure of a terminal device according to an embodiment of the present disclosure. The terminal device 600 includes, but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. Those skilled in the art can understand that the structure of the terminal device shown in FIG. 6 does not constitute a limitation to the terminal device. The terminal device may include more or fewer components than those shown in the figure, a combination of some components, or different arrangement of components. In the embodiment of the present disclosure, the terminal device includes but is not limited to a mobile phone, a tablet computer, a notebook computer, a palmtop computer, a vehicle-mounted mobile terminal, a wearable device, a pedometer, or the like.

The radio frequency unit 601 is configured to receive configuration information transmitted by a network side device. The configuration information is used to indicate the SCS configuration information of the channel on the same BWP; and different channels have different SCS configuration information or the same channel has different SCS configuration information in different cases.

The processor 610 is configured to determine the SCS of the target channel according to the configuration information.

In the embodiment of the present disclosure, different SCS information is configured for the channels on the same BWP, so that different channels have different SCS configuration information or the same channel has different SCS configuration information in different cases. Therefore, the solution of the embodiments of the present disclosure can enlarge the coverage range of the channel.

PDCCH and PDSCH have different SCS configuration information. Optionally, the processor 610 is configured to obtain SCS configuration information of the PDCCH transmitted by the network side device through system information or RRC signaling, and acquire SCS configuration information of the PDSCH transmitted by the network side device through the system information or the RRC signaling.

PDCCH and PDCCH have different SCS configuration information. Optionally, the processor 610 is configured to obtain at least two pieces of SCS configuration information transmitted by the network side device through system information or RRC signaling; and determine the SCS of the target PDCCH according to the at least two pieces of SCS configuration information and at least one selection rule, wherein the selection rule is configured by the network side device or agreed in advance.

Optionally the processor 610 is configured to perform at least one of the following:
determining SCS of the target PDCCH according to the type of the search space of the target PDCCH;
determining SCS of the target PDCCH according to a DCI format monitored on the search space of the target PDCCH; or
determining SCS of the target PDCCH according to the AL monitored in the search space of the target PDCCH.

PDCCH and PDCCH have different SCS configuration information. Optionally, the processor 610 is configured to determine SCS of the target PDCCH according to the SCS configuration information of the search space of the target PDCCH.

A first channel and a second channel have different SCS configuration information, wherein the first channel and the second channel are selected from: PDSCH and PUSCH.

Optionally, the processor 610 is configured to perform at least one of the following:
determining SCS of the first channel according to SCS configuration information of PDCCH for scheduling the first channel, and determining SCS of the second channel according to SCS configuration information of the PDCCH for scheduling the second channel, or
receiving DCI indication of the network side device, and determining the SCS of the first channel and the SCS of the second channel according to the DCI indication.

Optionally, the processor 610 is configured to perform at least one of the following:
determining the SCS of the first channel and the SCS of the second channel through the size of the DCI frequency domain allocation resource;
in a first time period after the DCI is obtained, determining the SCS of the first channel by using the SCS configuration information transmitted by the network side device through the RRC signaling or the SCS configuration information of the PDCCH for scheduling the first channel, and determining the SCS of the second channel by using the SCS configuration information transmitted by the network side device through the RRC signaling or the SCS configuration information of the PDCCH for scheduling the second channel; at other times, determining the SCS configuration information indicated by the DCI as the SCS of the first channel or the SCS of the second channel; or
determining the SCS of the first channel and the SCS of the second channel according to information indicated by a specified domain of the DCI.

A first channel and a second channel have different SCS configuration information, wherein the first channel and the second channel are selected from: PDSCH and PUSCH.

Optionally, the processor 610 is configured to perform at least one of the following:
obtaining at least two pieces of SCS configuration information transmitted by the network side device through system information or RRC signaling, or
determining the SCS of the first channel and the SCS of the second channel according to the at least two pieces of configuration information and at least one selection rule,
the selection rule being configured by the network side device or agreed in advance.

Optionally the processor 610 is configured to perform at least one of the following:
determining the SCS of the first channel by using the type of the search space of the PDCCH for scheduling the first channel, and determining the SCS of the second channel by using the type of the search space of the PDCCH for scheduling the second channel;
determining the SCS of the first channel by using the DCI format monitored on the search space of the PDCCH for scheduling the first channel, and determining the SCS of the second channel by using the DCI format monitored on the search space of the PDCCH for scheduling the second channel;
determining the SCS of the first channel by using a radio network temporary identifier (RNTI) type monitored on the search space of the PDCCH for scheduling the first channel, and determining the SCS of the second channel by using an RNTI type monitored on the search space of the PDCCH for scheduling the second channel; or
determining the SCS of the first channel through a parameter of the first channel configured by a higher layer, and determining the SCS of the second channel through a parameter of the second channel configured by a higher layer.

Optionally, the processor 610 is configured to determine the SCS of the target channel according to the target time domain resource and the SCS configuration information of different time domain resources transmitted by the network side device.

Optionally, the processor 610 is configured to determine the target time domain resource used for transmitting the target channel; and determine the SCS of the target channel according to the characteristic of the target time domain resource, at least two pieces of SCS configuration information transmitted by the network side device, and a corresponding relationship between the SCS configuration information and the time domain resource characteristic.

Optionally, the processor 610 is configured to transmit SCS of a reference signal in the BWP.

Optionally, the processor 610 is configured to: in a case of channel transmission at the same time when the reference signal is transmitted, determine the SCS of the reference signal according to the SCS configuration information of the channel; and in a case of no channel transmission at the same time when the reference signal is transmitted, transmit the SCS of the reference signal according to the SCS configuration information of the reference signal transmitted by the network side device through any one or more of the following ways: system information, RRC signaling, MAC CE and DCI.

Optionally, the radio frequency unit 601 receives a reference SCS transmitted by the network side device, wherein the reference SCS is any constant, and the constant includes the SCS of any channel on the BWP.

It should be understood that, in this embodiment of the present disclosure, the radio frequency unit 601 may be configured to receive and transmit information or a signal in a call process. For example, after receiving downlink data from a base station, the radio frequency unit 601 transmits the downlink data to the processor 610 for processing. In addition, the radio frequency unit 601 transmits uplink data to the base station. Generally, the radio frequency unit 601 includes but is not limited to: an antenna, at least one amplifier, a transceiver, a coupler, a low noise amplifier, and a duplexer. In addition, the radio frequency unit 601 can also communicate with another device through a wireless communications system and network.

The terminal device provides a user with wireless broadband Internet access through the network module 602, for example, helps the user send and receive emails, browse web pages, and access streaming media.

The audio output unit 603 may convert audio data received by the radio frequency unit 601 or the network module 602 or stored in the memory 609 into an audio signal, and output the audio signal into sound. In addition, the audio output unit 603 may further provide audio output (for example, call signal receiving sound or message receiving sound) related to a specific function performed by the terminal 600. The audio output unit 603 includes a loudspeaker, a buzzer, a receiver, and the like.

The input unit 604 is configured to receive audio or radio frequency signals. The input unit 604 may include a graphics processing unit (GPU) 6041 and a microphone 6042. The graphics processing unit 6041 processes image data of a static image or video obtained by an image capture device (such as a camera) in a video capture mode or an image capture mode. A processed image frame can be displayed on the display unit 606. The image frame processed by the graphics processing unit 6041 may be stored in the memory 609 (or another storage medium) or transmitted via the radio frequency unit 601 or the network module 602. The microphone 6042 may receive a sound and can process such sound into audio data. The processed audio data may be converted, in a telephone call mode, into a format that may be sent by the radio frequency unit 601 to a mobile communication base station for output.

The terminal device 600 further includes at least one sensor 605, such as an optical sensor, a motion sensor, and other sensors. Optionally, the light sensor includes an ambient light sensor and a proximity sensor. The ambient light sensor may adjust luminance of the display panel 6061 based on brightness of ambient light. The proximity sensor may turn off the display panel 6061 and/or backlight when the terminal device 600 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 may be configured to receive input digit or character information, and generate key signal input related to user setting and function control of the terminal device. Optionally, the user input unit 607 includes a touch panel 6071 and other input devices 6072. The touch panel 6071, also called a touch screen, may collect a touch operation of the user on or near the touch panel 6071 (for example, the user uses any suitable object or accessory such as a finger or a stylus to operate on or near the touch panel 6071). The touch panel 6071 may include two parts: a touch detection apparatus and a touch controller. The touch detection device detects a touch position of a user, detects a signal brought by a touch operation, and transmits the signal to the touch controller. The touch controller receives touch information from the touch detection apparatus, converts the touch information into contact coordinates, sends the contact coordinates to the processor 610, and receives and executes a command from the processor 610. In addition, the touch panel 6071 may be implemented by using a plurality of types such as a resistive type, a capacitive type, an infrared ray, and a surface acoustic wave. In addition to the touch panel 6071, the user input unit 607 may further include the another input device 6072. Optionally, the other input devices 6072 may include but are not limited to: a physical keyboard, a function key (such as a volume control key, a switch key), a trackball, a mouse, and a joystick, which is no longer repeated here.

Optionally, the touch panel 6071 may cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 6, the touch panel 6071 and the display panel 6061 are configured as two independent components to implement input and output functions of the terminal device, in some embodiments, the touch panel 6071 and the display panel 6061 can be integrated to implement the input and output functions of the terminal device. Details are not limited herein.

The interface unit 608 is an interface for connecting an external apparatus to the terminal device 600. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 608 may be configured to receive an input (for example, data information or power) from the external apparatus and transmit the received input to one or more elements in the terminal device 600, or transmit data between the terminal device 600 and the external device.

The memory 609 may be configured to store a software program and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random access memory or a nonvolatile memory, for example, at least one disk storage device, a flash memory, or other volatile solid-state storage devices.

The processor 610 is a control center of the terminal device, connects various parts of the entire terminal device by using various interfaces and circuits, and performs various functions of the terminal device and processes data by running or executing the software programs and/or the modules stored in the memory 609 and invoking data stored in the memory 609, so as to monitor the terminal device as a whole. The processor 610 can include one or more processing units. Optionally, the processor 610 can be integrated with an application processor and a modem processor. The application processor mainly processes the operating system, the user interface, applications, etc. The modem processor mainly processes wireless communication. It can be understood that the above-mentioned modem processor is not necessarily integrated in the processor 610.

The terminal device 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal device 600 includes some function modules not shown. Details are not described herein.

Optionally, the embodiment of the present disclosure also provides a terminal device, including a processor 610, a memory 609, and a computer program stored in the memory 609 and executable on the processor 610. When the computer program is executed by the processor 610, each process in the above parameter setting method embodiment is implemented, and the same technical effect can be achieved. In order to avoid repetition, details are not repeated here.

Figure 7:
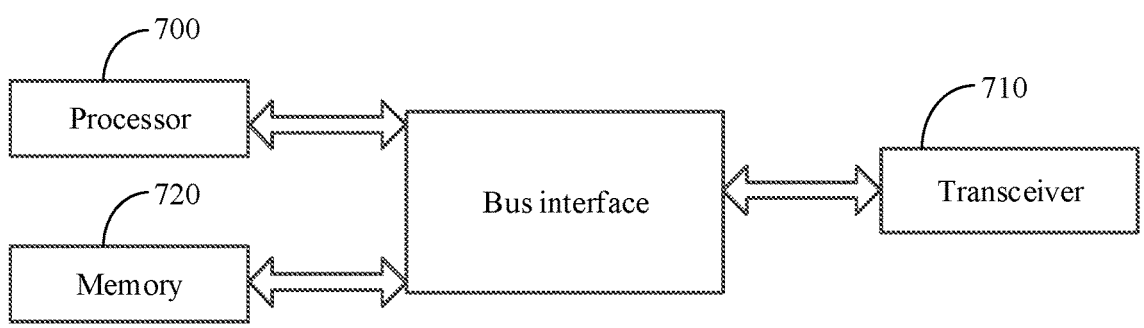
FIG. 7 is a second structural diagram of a network side device according to an embodiment of the present disclosure.

As shown in FIG. 7, the network side device of the embodiment of the present disclosure includes: a processor 700, configured to read a program in the memory 720 and perform the following processes:

transmitting configuration information to a terminal, wherein the configuration information is used to indicate SCS configuration information of a channel on the same BWP, and different channels have different SCS configuration information or the same channel has different SCS configuration information in different cases.

The transceiver 710 is configured to receive and send data under control of the processor 700.

In FIG. 7, a bus architecture may include any quantity of interconnected buses and bridges, which are connected together by one or more processors represented by the processor 700 and various circuits of a memory represented by the memory 720. The bus architecture may further connect together various other circuits of a peripheral device, a voltage stabilizer, a power management circuit, and the like, which are known in this art and will not be further described herein. The bus interface provides an interface. The transceiver 710 may be a plurality of elements, in other words, includes a transmitter and a receiver, and provides a unit configured to communicate with various other devices on a transmission medium. The processor 700 is responsible for bus architecture management and general processing. The memory 720 may store data used by the processor 700 when the processor 700 performs an operation.

The processor 700 is responsible for bus architecture management and general processing. The memory 720 may store data used by the processor 700 when operation is performed.

The different channels have different SCS configuration information or the same channel has different SCS configuration information in different cases, including at least one of the following:

the PDCCH and the PDSCH have different SCS configuration information;

the PDCCH and the PDCCH have different SCS configuration information;

a first channel and a second channel have different SCS configuration information, wherein the first channel and the second channel are selected from: PDSCH and PUSCH; or channels transmitted on at least two different time domain resources have different SCS configuration information.

In a case that a physical downlink control channel (PDCCH) and a physical downlink shared channel (PDSCH) have different SCS configuration information, the processor 700 is further configured to read the computer program and perform the following steps:

transmitting configuration information to the terminal through system information or RRC signaling.

In a case that the PDCCH and the PDCCH have different SCS configuration information, the processor 700 is further configured to read the computer program and perform at least one of the following:

transmitting at least two pieces of SCS configuration information to the terminal through system information or RRC signaling; or configuring the SCS configuration information for each search space of the PDCCH, wherein the SCS configuration information between at least two search spaces is different.

The processor 700 is further configured to read the computer program and perform at the following steps:

transmitting at least one selection rule to the terminal through the system information or the RRC signaling, the selection rule being used to determine SCS of a target PDCCH according to the at least two pieces of SCS configuration information; and the selection rule includes at least one of the following:

determining SCS configuration information of the target PDCCH according to the type of the search space of the target PDCCH;

determining SCS control information of the target PDCCH according to a downlink control information (DCI) format monitored on the search space of the target PDCCH; or determining SCS configuration information of the target PDCCH according to an aggregation level (AL) monitored in the search space of the target PDCCH.

In a case that the first channel and the second channel have different SCS configuration information, the processor 700 is further configured to read the computer program and perform at least one of the following:

configuring SCS configuration information for scheduling the first channel as SCS configuration information of the first channel, and configuring SCS configuration information of the PDCCH for scheduling the second channel as SCS configuration information of the second channel;

transmitting at least two pieces of SCS configuration information to the terminal through system information or RRC signaling; or indicating the SCS configuration information of the first channel and the SCS configuration information of the second channel through DCI.

The processor 700 is further configured to read the computer program and perform at the following steps:

transmitting at least one selection rule to the terminal through the system information or the RRC signaling, wherein the selection rule is used to determine the SCS of the first channel and the SCS of the second channel according to the at least two pieces of SCS configuration information.

The selection rule includes at least one of the following:

determining the SCS of the first channel by using the type of the search space of the PDCCH for scheduling the first channel, and determining the SCS of the second channel by using the type of the search space of the PDCCH for scheduling the second channel;

determining the SCS of the first channel by using the DCI format monitored on the search space of the PDCCH for scheduling the first channel, and determining the SCS of the second channel by using the DCI format monitored on the search space of the PDCCH for scheduling the second channel;

determining the SCS of the first channel by using a radio network temporary identifier (RNTI) type monitored on the search space of the PDCCH for scheduling the first channel, and determining the SCS of the second channel by using an RNTI type monitored on the search space of the PDCCH for scheduling the second channel; or determining the SCS of the first channel through a parameter of the first channel configured by a higher layer, and determining the SCS of the second channel through a parameter of the second channel configured by a higher layer.

The processor 700 is further configured to read the computer program and perform at the following least one of the following:

determining the SCS configuration information of the first channel and the SCS configuration information of the second channel through the size of a DCI frequency domain allocation resource;

in a first time period after the DCI, taking the SCS configuration information transmitted through the RRC signaling or the SCS configuration information of the PDCCH for scheduling the first channel as the SCS configuration information of the first channel, and taking the SCS configuration information transmitted through the RRC signaling or the SCS configuration information of the PDCCH for scheduling the second channel as the SCS configuration information of the second channel; at other times, taking the SCS configuration information indicated by the DCI as the SCS configuration information of the first channel or the SCS configuration information of the second channel; and indicating the SCS configuration information of the first channel and the SCS configuration information of the second channel through a specified domain of the DCI.

In a case that channels transmitted on at least two different time domain resources have different SCS configuration information, the processor 700 is further configured to read the computer program and perform at least one of the following:

indicating that at least two different time domain resources have different SCS configuration information through RRC signaling; or configuring at least two pieces of SCS configuration information, a corresponding relationship between the SCS configuration information and the characteristics of the time domain resources through the RRC signaling.

The processor 700 is further configured to read the computer program and perform the following steps:

transmitting SCS configuration information of a reference signal in the BWP to the terminal.

In a case of channel transmission at the same time when the reference signal is transmitted, determining the SCS configuration information of the reference signal is the SCS configuration information of the channel; and in a case of no channel transmission at the same time when the reference signal is transmitted, the SCS configuration information of the reference signal is configured through any one or more of the following ways:

system information, RRC signaling, MAC CE and DCI.

The processor 700 is further configured to read the computer program and perform the following steps:

transmitting reference SCS to the terminal, wherein the reference SCS is any constant, and the constant includes SCS of any channel on the BWP.

The embodiment of the present disclosure further provides a non-transitory computer readable storage medium. The non-transitory computer readable storage medium stores a computer program, and when the computer program is executed by a processor, the processes of the foregoing parameter setting method embodiment are implemented, and the same technical effect can be achieved. To avoid repetition, details are not described herein again. The non-transitory computer readable storage medium is a read-only memory (ROM), a random access memory (RAM), a magnetic disk, an optical disc, or the like.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A method for SCS configuration between channel, applied to a network side device and comprising:
   transmitting configuration information to a terminal, wherein the configuration information is used to indicate subcarrier space (SCS) configuration information of a channel on a same bandwidth part (BWP), and different channels have different SCS configuration information or a same channel has different SCS configuration information in different cases; wherein
   in a case that a physical downlink control channel (PDCCH) and a PDCCH have different SCS configuration information, the transmitting the configuration information to the terminal comprises:
   transmitting at least two pieces of SCS configuration information to the terminal through system information or radio resource control (RRC) signaling; wherein
   the method further comprises:
   transmitting at least one selection rule to the terminal through system information or RRC signaling, a selection rule being used to determine SCS of a target PDCCH according to the at least two pieces of SCS configuration information; wherein
   the selection rule comprises at least one of:
   determining SCS configuration information of the target PDCCH according to the type of the search space of the target PDCCH;
   determining SCS control information of the target PDCCH according to a downlink control information (DCI) format monitored on the search space of the target PDCCH; or
   determining SCS configuration information of the target PDCCH according to an aggregation level (AL) monitored in the search space of the target PDCCH.

2. The method according to claim 1, wherein that the different channels have different SCS configuration information or a same channel has different SCS configuration information in different cases comprises at least one of:
   a physical downlink control channel (PDCCH) and a physical downlink shared channel (PDSCH) having different SCS configuration information;
   a PDCCH and a PDCCH having different SCS configuration information;
   a first channel and a second channel having different SCS configuration information, the first channel and the second channel being selected from a PDSCH or a physical uplink shared channel (PUSCH); or
   channels transmitted on at least two different time domain resources having different SCS configuration information.

3. The method according to claim 1, wherein in a case that a physical downlink control channel (PDCCH) and a physical downlink shared channel (PDSCH) have different SCS configuration information, the transmitting the configuration information to the terminal comprises:
   transmitting the configuration information to the terminal through system information or radio resource control (RRC) signaling.

4. The method according to claim 1, wherein in a case that a physical downlink control channel (PDCCH) and a PDCCH have different SCS configuration information, the transmitting the configuration information to the terminal further comprises:
   configuring the SCS configuration information for each search space of each PDCCH, the SCS configuration information between at least two search spaces being different.

5. The method according to claim 1, wherein in a case that a first channel and a second channel have different SCS configuration information, the transmitting the configuration information to the terminal comprises at least one of:
   configuring SCS configuration information of a physical downlink control channel (PDCCH) for scheduling the first channel as SCS configuration information of the first channel, and configuring SCS configuration information of a PDCCH for scheduling the second channel as SCS configuration information of the second channel;
   transmitting at least two pieces of SCS configuration information to the terminal through system information or radio resource control (RRC) signaling; or
   indicating the SCS configuration information of the first channel and the SCS configuration information of the second channel through downlink control information (DCI).

6. The method according to claim 5, wherein in a case that at least two pieces of SCS configuration information are transmitted to the terminal through the system information or the RRC signaling, the method further comprises:
   transmitting at least one selection rule to the terminal through system information or RRC signaling, a selection rule being used to determine the SCS of the first channel and the SCS of the second channel according to the at least two pieces of SCS configuration information; wherein
   the selection rule comprises at least one of:
   determining the SCS of the first channel by using the type of the search space of the PDCCH for scheduling the first channel, and determining the SCS of the second channel by using the type of the search space of the PDCCH for scheduling the second channel;
   determining the SCS of the first channel by using the DCI format monitored on the search space of the PDCCH for scheduling the first channel, and determining the SCS of the second channel by using the DCI format monitored on the search space of the PDCCH for scheduling the second channel;
   determining the SCS of the first channel by using a radio network temporary identifier (RNTI) type monitored on the search space of the PDCCH for scheduling the first channel, and determining the SCS of the second channel by using an RNTI type monitored on the search space of the PDCCH for scheduling the second channel; or determining the SCS of the first channel through a parameter of the first channel configured by a higher layer, and determining the SCS of the second channel through a parameter of the second channel configured by a higher layer.

7. The method according to claim 5, wherein the indicating the SCS configuration information of the first channel and the SCS configuration information of the second channel through DCI comprises at least one of:

determining the SCS configuration information of the first channel and the SCS configuration information of the second channel through the size of a DCI frequency domain allocation resource;

in a first time period after the DCI, using SCS configuration information transmitted through the RRC signaling or SCS configuration information of the PDCCH for scheduling the first channel as the SCS configuration information of the first channel, and using SCS configuration information transmitted through the RRC signaling or SCS configuration information of the PDCCH for scheduling the second channel as the SCS configuration information of the second channel; at other times, using SCS configuration information indicated by the DCI as the SCS configuration information of the first channel or the SCS configuration information of the second channel; or indicating the SCS configuration information of the first channel and the SCS configuration information of the second channel through a specified domain of the DCI.

8. The method according to claim 1, wherein in a case that the channels transmitted on at least two different time domain resources have different SCS configuration information, the transmitting the configuration information to the terminal comprises at least one of:

indicating that at least two different time domain resources have different SCS configuration information through radio resource control (RRC) signaling; or configuring at least two pieces of SCS configuration information, and a corresponding relationship between the SCS configuration information and characteristics of the time domain resources through the RRC signaling.

9. The method according to claim 1, further comprising: transmitting SCS configuration information of a reference signal in the BWP to the terminal.

10. The method according to claim 9, wherein in a case of channel transmission at a same time when the reference signal is transmitted, determining the SCS configuration information of the reference signal is SCS configuration information of the channel; and in a case of no channel transmission at a same time when the reference signal is transmitted, the SCS configuration information of the reference signal is configured through any one or more of following ways:

system information, radio resource control (RRC) signaling, a medium access control (MAC) control element (CE) and a downlink control information (DCI).

11. The method according to claim 1, further comprising: transmitting reference SCS to the terminal; wherein the reference SCS is any constant, and the constant comprises SCS of any channel on the BWP.

12. A network side device, comprising: a memory, a processor, and a computer program stored in the memory and executable on the processor, wherein the computer program, when executed by the processor, cause the network side device to perform:

transmitting configuration information to a terminal, wherein the configuration information is used to indicate subcarrier space (SCS) configuration information of a channel on a same bandwidth part (BWP), and different channels have different SCS configuration information or a same channel has different SCS configuration information in different cases; wherein in a case that a physical downlink control channel (PDCCH) and a PDCCH have different SCS configuration information, the network side device performs:

transmitting at least two pieces of SCS configuration information to the terminal through system information or radio resource control (RRC) signaling; wherein the computer program, when executed by the processor, cause the network side device further to perform:

transmitting at least one selection rule to the terminal through system information or RRC signaling, a selection rule being used to determine SCS of a target PDCCH according to the at least two pieces of SCS configuration information; wherein the selection rule comprises at least one of:

determining SCS configuration information of the target PDCCH according to the type of the search space of the target PDCCH;

determining SCS control information of the target PDCCH according to a downlink control information (DCI) format monitored on the search space of the target PDCCH; or determining SCS configuration information of the target PDCCH according to an aggregation level (AL) monitored in the search space of the target PDCCH.

13. The network side device according to claim 12, wherein the different channels have different SCS configuration information or a same channel has different SCS configuration information in different cases comprises at least one of:

a physical downlink control channel (PDCCH) and a physical downlink shared channel (PDSCH) having different SCS configuration information;

the PDCCH and the PDCCH having different SCS configuration information;

a first channel and a second channel having different SCS configuration information, the first channel and the second channel being selected from a PDSCH or a physical uplink shared channel (PUSCH); or channels transmitted on at least two different time domain resources having different SCS configuration information.

14. A terminal device, comprising: a memory, a processor, and a computer program stored in the memory and executable on the processor, wherein the computer program, when executed by the processor, causes the terminal device to perform:

receiving configuration information transmitted by a network side device, wherein the configuration information is used to indicate subcarrier space (SCS) configuration information of a channel on a same bandwidth part (BWP), and different channels have different SCS configuration information or a same channel has different SCS configuration information in different cases; and determining SCS of a target channel according to the configuration information; wherein a physical downlink control channel (PDCCH) and a PDCCH have different SCS configuration information; and the computer program, when executed by the processor, causes the terminal device to perform:

obtaining at least two pieces of SCS configuration information transmitted by the network side device through system information or radio resource control (RRC) signaling, and determining SCS of a target PDCCH according to the at least two pieces of SCS configuration information and at least one selection rule; wherein the at least one selection rule is configured by the network side device or agreed in advance; wherein determining the SCS of the target PDCCH according to the at least two pieces of SCS configuration information and at least one selection rule comprises at least one of:

determining SCS of the target PDCCH according to a type of search space of the target PDCCH;

determining SCS of the target PDCCH according to a downlink control information (DCI) format monitored on the search space of the target PDCCH; or determining SCS of the target PDCCH according to an aggregation level (AL) monitored in the search space of the target PDCCH.

15. The terminal device according to claim 14, wherein a physical downlink control channel (PDCCH) and a physical downlink shared channel (PDSCH) have different SCS configuration information; and the computer program, when executed by the processor, causes the terminal device to perform:

obtaining SCS configuration information of the PDCCH transmitted by the network side device through system information or radio resource control (RRC) signaling, and obtaining SCS configuration information of the PDSCH transmitted by the network side device through system information or RRC signaling.

16. The terminal device according to claim 14, wherein a physical downlink control channel (PDCCH) and a PDCCH have different SCS configuration information; and the computer program, when executed by the processor, causes the terminal device to perform:

determining SCS of a target PDCCH according to SCS configuration information of search space of the target PDCCH.

17. The terminal device according to claim 14, wherein the computer program, when executed by the processor, causes the terminal device to perform:

determining a target time domain resource used for transmitting the target channel; and determining the SCS of the target channel according to SCS configuration information of channels transmitted on different time domain resources and transmitted by the target time domain resource and the network side device; and/or the computer program, when executed by the processor, causes the terminal device to perform:

determining a target time domain resource used for transmitting the target channel; and determining the SCS of the target channel according to characteristic of the target time domain resource, at least two pieces of SCS configuration information transmitted by the network side device and a corresponding relationship between the SCS configuration information and the characteristics of the time domain resource.

18. The terminal device according to claim 14, wherein the computer program, when executed by the processor, causes the terminal device to further perform:

transmitting SCS of a reference signal in the BWP; and/or receiving reference SCS transmitted by the network side device; wherein the reference SCS is any constant, and the constant comprises SCS of any channel on the BWP.

* * * * *